US010585369B2

(12) United States Patent
Aga et al.

(10) Patent No.: US 10,585,369 B2
(45) Date of Patent: Mar. 10, 2020

(54) FERRITE PARTICLE HAVING OUTER SHELL STRUCTURE

(71) Applicant: POWDERTECH CO., LTD., Chiba (JP)

(72) Inventors: Koji Aga, Chiba (JP); Takao Sugiura, Chiba (JP)

(73) Assignee: POWDERTECH CO., LTD., Chiba (JP)

(*) Notice: Subject to any disclaimer, the term of this patent is extended or adjusted under 35 U.S.C. 154(b) by 0 days.

(21) Appl. No.: 15/544,729

(22) PCT Filed: Jan. 25, 2016

(86) PCT No.: PCT/JP2016/052028
§ 371 (c)(1),
(2) Date: Jul. 19, 2017

(87) PCT Pub. No.: WO2016/121697
PCT Pub. Date: Aug. 4, 2016

(65) Prior Publication Data
US 2018/0011414 A1  Jan. 11, 2018

(30) Foreign Application Priority Data
Jan. 28, 2015 (JP) ................................ 2015-013793

(51) Int. Cl.
*G03G 9/113* (2006.01)
*G03G 9/10* (2006.01)
(Continued)

(52) U.S. Cl.
CPC ........... *G03G 9/1139* (2013.01); *C01G 49/00* (2013.01); *G03G 9/107* (2013.01); *G03G 9/1075* (2013.01);
(Continued)

(58) Field of Classification Search
CPC ... G03G 9/1139; G03G 9/1075; G03G 9/1131
See application file for complete search history.

(56) References Cited

U.S. PATENT DOCUMENTS 4,925,762 A * 5/1990 Ostertag .............. G03G 9/1075
427/216
5,039,559 A * 8/1991 Sang ......................... B03C 1/01
106/457
(Continued)

FOREIGN PATENT DOCUMENTS

JP   H08-500908 A   1/1996
JP   2007-034249 A  2/2007
(Continued)

OTHER PUBLICATIONS

English language translation of JP 2014-182304 (Sep. 2014).*
International Search Report with Patent Application No. PCT/JP2016/052028, dated Apr. 19, 2016.

*Primary Examiner* — Christopher D Rodee
(74) *Attorney, Agent, or Firm* — Greenblum & Bernstein, P.L.C.

(57) ABSTRACT

An object of the present invention is to provide a ferrite particle having a low apparent density, filling a specified volume with a low weight with various properties maintained in a controllable state, a ferrite carrier core material composed of the ferrite particle, and a ferrite carrier using the ferrite core material and an electrophotographic developer. To achieve the object, the ferrite particle having the outer shell structure containing the Ti oxide for the ferrite carrier core material, and the ferrite carrier using the ferrite particle as the ferrite carrier core material and the electrophotographic developer are employed.

12 Claims, 4 Drawing Sheets

ELECTRON BEAM IMAGE 8

(51) Int. Cl.
  *G03G 9/107* (2006.01)
  *C01G 49/00* (2006.01)

(52) U.S. Cl.
  CPC ......... *G03G 9/1131* (2013.01); *G03G 9/1132* (2013.01)

(56) References Cited

U.S. PATENT DOCUMENTS

| | | | | |
|---|---|---|---|---|
| 5,496,674 | A | | 3/1996 | Adel et al. |
| 5,654,120 | A | * | 8/1997 | Hakata ................ G03G 9/10 430/111.32 |
| 8,465,898 | B2 | * | 6/2013 | Iwata ................ G03G 9/107 420/70 |
| 9,372,426 | B2 | * | 6/2016 | Aga ................ G03G 9/1075 |
| 2002/0025487 | A1 | * | 2/2002 | Lambert ............ G03G 9/107 430/122.51 |
| 2005/0277049 | A1 | * | 12/2005 | Katoh ............... G03G 9/1075 430/111.35 |
| 2006/0251982 | A1 | * | 11/2006 | Iwatsuki ............ G03G 9/1075 430/111.1 |
| 2007/0281160 | A1 | | 12/2007 | Krishna et al. |
| 2008/0160440 | A1 | * | 7/2008 | Nishikawa .......... G03G 9/1075 430/108.6 |
| 2009/0239173 | A1 | * | 9/2009 | Kobayashi ........... G03G 9/1131 430/111.31 |
| 2011/0129772 | A1 | | 6/2011 | Iwata et al. |
| 2011/0236820 | A1 | * | 9/2011 | Hasegawa ............. G03G 9/107 430/111.35 |
| 2012/0070772 | A1 | * | 3/2012 | Sugawara ........... G03G 9/0819 430/108.9 |
| 2016/0077454 | A1 | * | 3/2016 | Takenaka .............. G03G 9/113 430/110.2 |

FOREIGN PATENT DOCUMENTS

| | | |
|---|---|---|
| JP | 2007-320847 A | 12/2007 |
| JP | 2011-112960 A | 6/2011 |
| JP | 2012-058344 A | 3/2012 |
| JP | 2014-182304 A | 9/2014 |
| JP | 2014182304 A * | 9/2014 |

* cited by examiner

FERRITE PARTICLE HAVING OUTER SHELL STRUCTURE

TECHNICAL FIELD

The present invention relates to a ferrite particle, and more specifically to a ferrite particle used as a ferrite carrier core material for an electrophotographic developer with a binary component system used in a copier, a printer and the like, and a ferrite carrier using the ferrite carrier core material and an electrophotographic developer.

BACKGROUND ART

The electrophotographic developing method includes sticking of the toner particles in a developer on an electrostatic latent image formed on a photo conductor. The developers used in the method can be divided into two groups: a binary-component developer composed of toner particles and carrier particles, and a single-component developer using toner particles only. As the carrier particles, ferrite carrier particles composed of ferrite particles are used.

As the developing method using a binary-component developer composed of toner particles and carrier particles, a cascade method was used in old times and a magnetic brush method using a magnet roll is mainly used in the present days.

In a binary-component developer, the ferrite carrier particles are a support substance which gives a desired electric charge on a toner particle in stirring together with toner particles, and carries the toner particles with the electric charge to the surface of a photo conductor to form a toner image on the photo conductor. The ferrite carrier particles remaining on a developing roll holding a magnet return into a developing box again from the developing roll for mixing and stirring with new toner particles for repeated use in a certain period.

Different from in a single-component developer, a binary-component developer has a good controllability in designing a developer because ferrite carrier particles mixed and stirred with toner particles achieve functions for triboelectrically charging and carrying toner particles. So, a binary-component developer is suitable used in a full-color developing device required high definition image quality and a high-speed printer required reliability and durability of an image.

In the binary-component developer used in such a manner, image qualities such as image density, fogging, white spots, tone reproduction and resolution should be a specific level in the early stage and these qualities should be stably achieved without fluctuation in an endurance printing. To stably achieve the qualities, the ferrite carrier particles contained in the binary-component developer should have stable properties.

Patent Document 1 (Japanese Patent Laid-Open 2012-230373) discloses a resin carrier coated with a resin constituted by spherical composite particles composed of at least fine particles of ferromagnetic iron oxide as a magnet carrier core material and a phenol resin.

Patent Document 2 (Japanese Patent Laid-Open 2012-58344) discloses a ferrite carrier core material composed of porous ferrite particles that have the composition represented by $(MnO)_x(MgO)_y(Fe_2O_3)_z$, and a part of (MnO) (MgO) and/or ($Fe_2O_3$) is replaced by 0.3 to 4.0 wt % of SrO. Further, a resin filled ferrite carrier used for an electrophotographic developer wherein the pores of the ferrite carrier core material are filled with resin is disclosed.

Patent Document 3 (Japanese Patent Laid-Open No. 2007-34249) discloses a method of manufacturing a ferrite carrier used for an electrophotographic developer including the steps of preparing a granulated material by mixing resin particles, a binder, a dispersant, a moistening agent water and a raw material powder, wet pulverizing the mixture and drying the pulverized material, preparing the porous carrier core material by calcining and firing the granulated material and applying a resin on the porous carrier core material, and finish a resin coated ferrite carrier.

In recent years, the amount of carrier used tends to increase due to employment of the trickle development. On the other hand, the amount of developer and carrier used has been attempted to reduce for running cost reduction of a developer.

To reduce the amount of carrier used, a carrier having a low apparent density has been proposed. If the developing machines have the same volume, lower apparent density of carrier can reduce the weight used.

If a resin coated carrier is used for a long time, the coated resin may be peeled off due to the internal stress of a developing machine and the charging properties and the electric resistance required for image formation may change to make achievement of the stable images for a long time difficult.

From the viewpoint of energy saving, low-temperature fixing of toner has become widespread. However, negative effect on the image is worried because the low-temperature fixing of toner makes toner easily stick to the surface of a carrier due to the internal stress of a developing machine and fluctuation in charging properties of the carrier.

Although a carrier filled with resin and a resin carrier have been investigated to solve these problems, the large amount of resin used may result high electric resistivity and it causes difficulty in electric resistivity control of the carrier. Furthermore, as the charging properties are greatly influenced by the resin, available conditions of the carriers might be limited.

To solve these problems, a ferrite particle as a carrier not only low in specific weight but also easy in controlling of the charging properties and electric resistivity is required.

Patent Document 4 (Japanese Patent Laid-Open No. 2007-320847) discloses products containing a plurality of primary fine particles and core fine particle structures containing a plurality of primary pores and core-shell ceramic fine particles containing a shell surrounding at least a part of core fine particle structure. The products include a membrane, a sensor, an electrode, and a getter.

The core-shell ceramic fine particles disclosed in Patent Document 4 is constituted by yttrium stabilized zirconia and lanthanum ferrite as the shell. As lanthanum ferrite is used as the shell, the ferrite particles are low in apparent density and filling of a specified volume with a low weight with various properties maintained in a controllable state may not be achieved.

CITATION LIST

Patent Document

Patent Document 1: Japanese Patent Laid-Open 2012-230373

Patent Document 2: Japanese Patent Laid-Open 2012-58344

Patent Document 3: Japanese Patent Laid-Open No. 2007-34249

Patent Document 4: Japanese Patent Laid-Open No. 2007-320847

SUMMARY OF INVENTION

Problems to be Solved

An object of the present invention is to provide a ferrite particle having a low apparent density, various properties are maintained in a controllable state and filling of a specified volume with a low weight is achieved, a ferrite carrier core material composed of the ferrite particle, and a ferrite carrier using the ferrite core material and an electrophotographic developer using the ferrite carrier.

Means to Solve the Problem

Through extensive investigation to solve the problems described above, the present inventors have thought out that the object can be achieved by ferrite particles having an outer shell structure containing a Ti oxide, and the present invention was accomplished. The present invention was made based on the knowledge.

The present invention provides ferrite particles for a ferrite carrier core material characterized in having the outer shell structure containing a Ti oxide.

The ferrite particles according to the present invention is preferable that the thickness of the outer shell structure is 0.5 to 10 µm.

The ferrite particles according to the present invention is preferable that the density of the internal part of the particle is lower than that of the outer shell structure.

The ferrite particles according to the present invention is preferable that the volume average particle diameter is 10 to 100 µm.

The present invention provides a ferrite carrier core material for an electrophotographic developer characterized in using the ferrite particles.

The present invention provides a ferrite carrier for an electrophotographic developer characterized in that the ferrite carrier is the ferrite carrier core material impregnated and/or coated with a resin.

The present invention provides an electrophotographic developer composed of the ferrite carrier and a toner.

The electrophotographic developer according to the present invention can be used as a refill developer.

Advantages of the Invention

As the ferrite particles according to the present invention have the outer shell structure containing Ti, the ferrite particles have low apparent density and fill a specified volume with a low weight with various properties maintained in a controllable state. As a result, the electrophotographic developer composed of a ferrite carrier prepared by using the ferrite particle as a ferrite carrier core material impregnated and/or coated with a resin and a toner hardly causes the spent due to less stress on the toner in stirring, and is excellent in charging stability for long-time.

PREFERRED EMBODIMENTS OF THE INVENTION

The embodiments of the present invention will be described in the following.

<Ferrite Particles According to the Present Invention (Ferrite Carrier Core Material)>

The ferrite particles according to the present invention have the outer shell structure (core-shell form) containing titanium. As a result, the ferrite particles have a low apparent density with various properties maintained in a controllable state. In addition, the ferrite particles according to the present invention can fill the specified volume with a low weight of ferrite particles. The words "ferrite particles" in the present invention refer to a mass of individual ferrite particles unless otherwise noted, and the word "particles" refer to individual ferrite particle.

The outer shell structure is required to be formed such that the outer shell structure can be visually recognized in the cross-sectional SEM image of a ferrite particle embedded in a resin. More specifically, the proportion of the outer shell structure with a thickness in a certain range should account for 80% or more of the circumferential length. The proportion of the outer shell structure in the circumferential length is more preferable to be 90% or more.

The outer shell structure is preferable to have the thickness of 0.5 to 10 µm to achieve the intended object. If the thickness of the outer shell structure is less than 0.5 µm, the ferrite particles is weak in mechanical strength, and the various powder properties may not be achieved due to destroying. If destroying occur in use as carrier, scratch may generate on a photo conductor drum. If the thickness of the outer shell structure exceeds 10 µm, the ferrite particles having the outer shell structure are not different from the conventional ferrite particles, and no desired effect can be achieved. The thickness of the outer shell structure is more preferable to be 0.5 to 8 µm, most preferable to be 0.5 to 6.5 µm.

Figure 1:
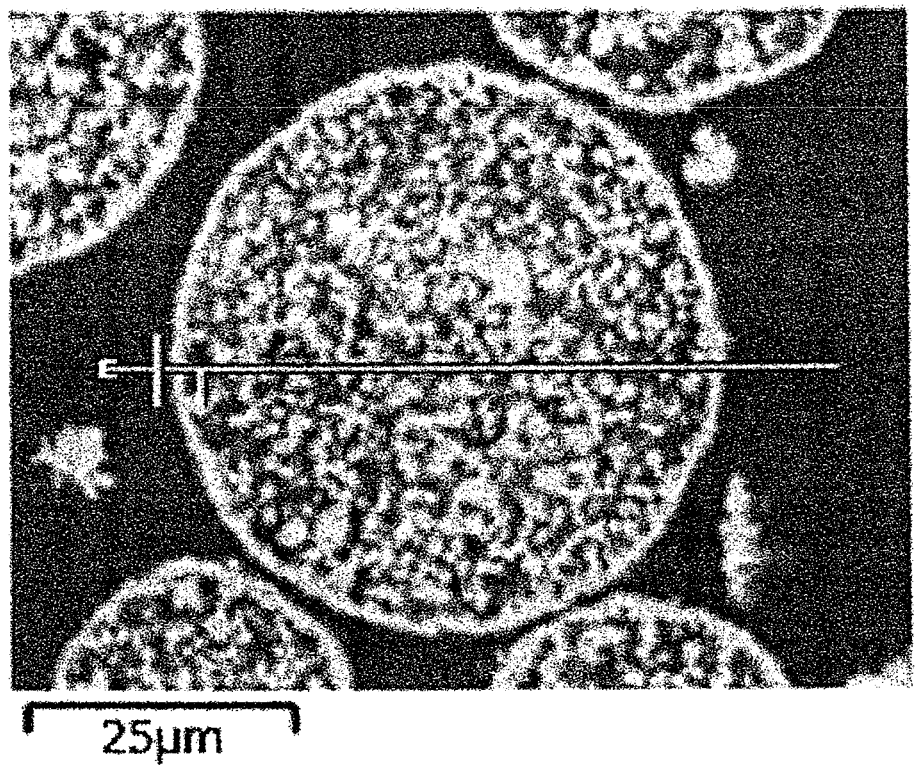
FIG. 1 is the electron micrograph (×200) of the cross section of the ferrite particle according to the present invention, showing the method of determining the thickness of the outer shell structure.
Figure 2:
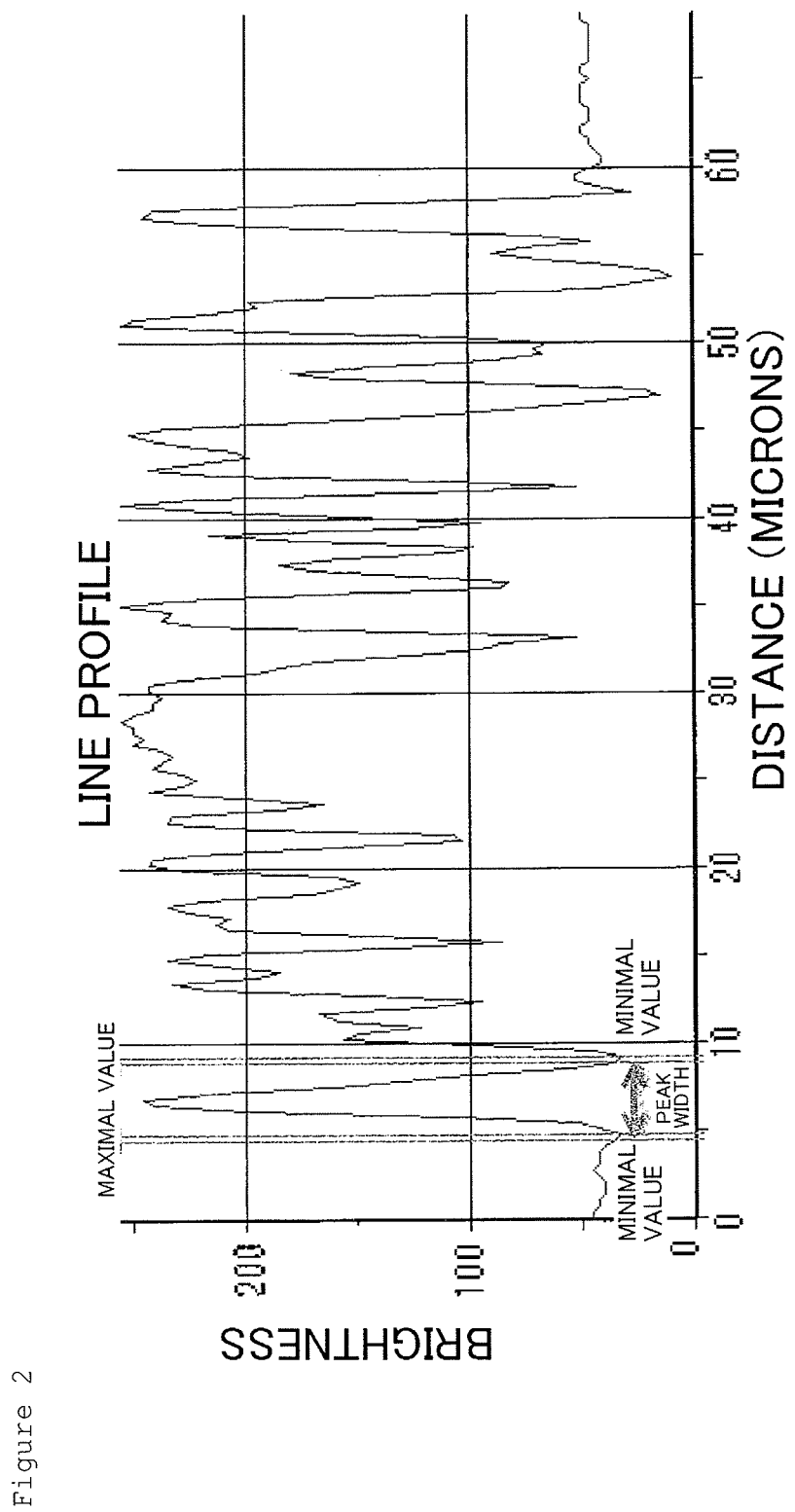
FIG. 2 is the graph analyzed the image shown in FIG. 1.
Figure 3:
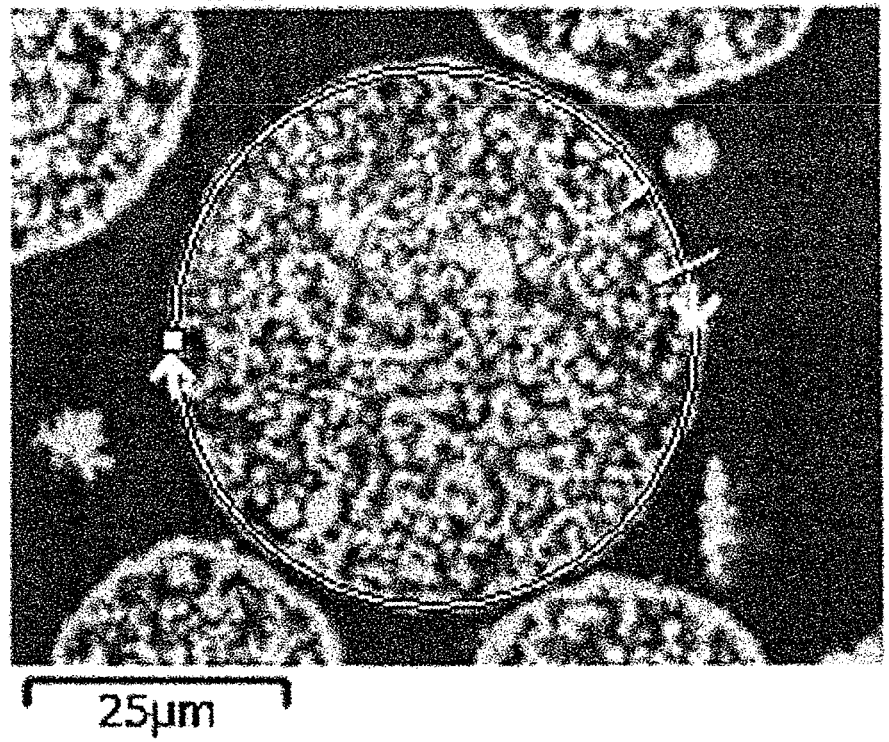
FIG. 3 show the method of examining the outer periphery of the portion having the outer shell structure in the electron micrograph.
Figure 4:
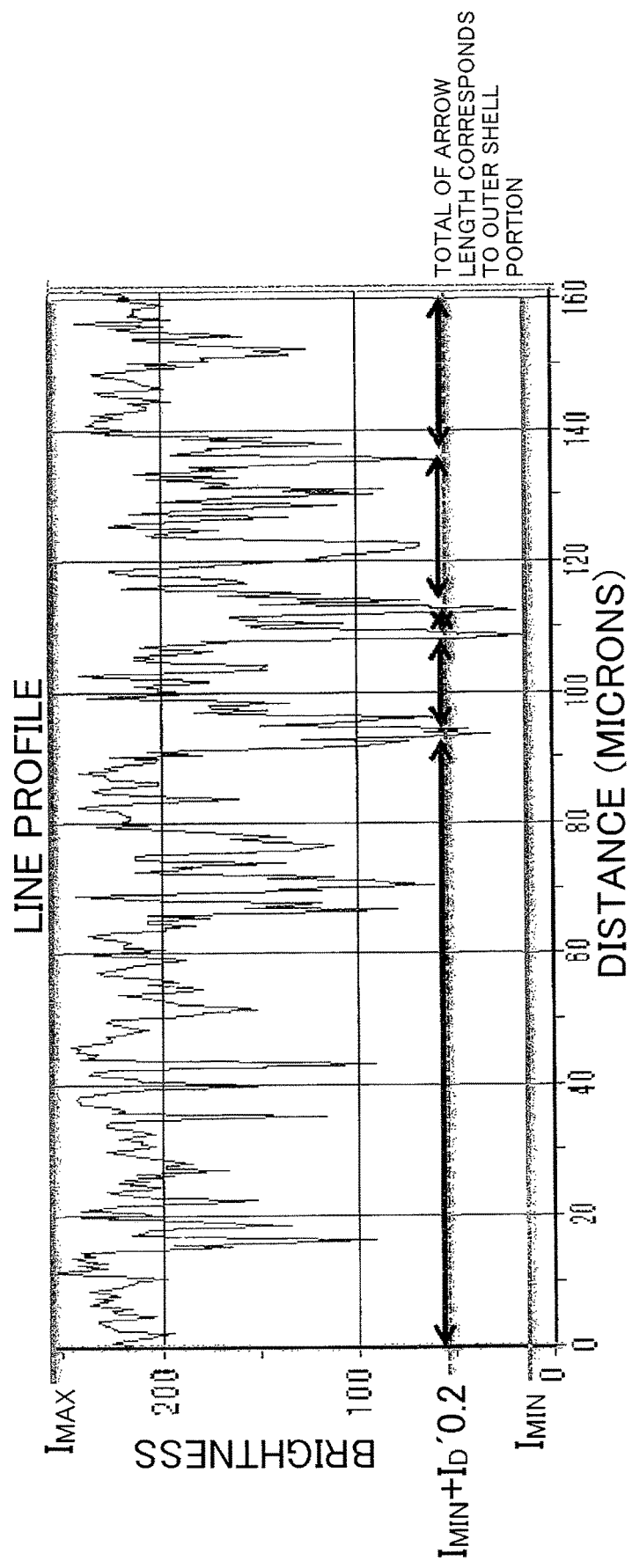
FIG. 4 is the graph analyzed the image shown in FIG. 3.

The thickness of the outer shell structure can be determined by observing the cross-section of a ferrite particle embedded in a resin with SEM as shown in FIGS. 1 and 3, and image-processing the image as described below in detail.

<Determination of Thickness of the Outer Shell Structure>

The thickness of the outer shell structure of the ferrite particles is examined by the following procedures.

The ferrite particles embedded in a resin is polished with a polishing machine at the cross section and subjected to gold vapor deposition to prepare the specimen for observing the cross section (for examining the thickness of the outer shell portion). The image of the specimen is photographed with JSM-6060A manufactured by JEOL Ltd., at the acceleration voltage of 5 kV, in a visual field at 200 magnifications. The image data is input to the image analyzing software (Image-Pro PLUS) manufactured by Media Cybernetics Inc., through the interface for analyzation. More specifically, in the contrast adjusted image, the brightness of the image is extracted for particles by the line profile function of the analyzing software. On this occasion, the straight line profile passing through the approximate center of the particle in the horizontal direction is drawn. Among the peaks present in the profile, the peak corresponding to the outer shell portion is put between two markers, and the width between two markers is assumed to be the thickness of the outer shell portion. The peak is defined by the maximum value between two minimum values in the line profile. Note that, the contrast is adjusted to make the brightness at embedding resin portion (corresponding to background) 50% or less relative to the maximum brightness. The same procedures are carried out for 30 particles in the same manner, and the average is assumed to be the thickness of the outer shell structure.

The proportion of the outer periphery of the outer shell structure in the circumferential length can be examined by observing the cross-section of the ferrite particle embedded in the resin with SEM shown in FIGS. 1 and 3, and image-processing the image obtained as described later in detail.

<Determination of Proportion of the Outer Shell Structure in Outer Peripheral Direction>

The image is processed in the same manner as described above, and a line profile of circular or free-form curve (closed curve) is set for the outer shell structure of the particles. On this occasion, if the maximum brightness of the profile is represented by $I_{max}$, the minimum brightness is represented by $I_{min}$, and the difference between the maximum brightness and the minimum brightness is represented by $I_A$, the range from $I_{min}$ or more to less than $I_{min}+I_A \times 0.2$ is determined as the portion having no outer shell structure, and the range from $I_{min}+I_A \times 0.2$ or more to $I_{max}$ or less is determined as the outer shell portion. Among the brightness data in the line profile length (circumferential length) obtained by the line profile function, the line profile lengths having the brightness of $I_{min}+I_A \times 0.2$ or more to $I_{max}$ or less are integrated and divided by the line profile length (circumferential length), and the proportion of the outer periphery having the thickness in the certain range can be determined by the calculation. The same procedures are carried out for 30 particles, and the average is assumed to be the proportion of the outer periphery in the circumferential length (=density of the outer periphery).

(Determination of Proportion of Porous Portion in Internal Part of Particle)

The same image processing as described above is carried out with the straight line profile set to pass through the approximate center of each particle. On this occasion, if the maximum brightness of the profile is represented by $I_{max}$, the minimum brightness is represented by $I_{min}$, and the difference between the maximum brightness and the minimum brightness is represented by $I_A$, the range from $I_{min}$ or more to less than $I_{min}+I_A \times 0.2$ is determined as the portion without ferrite, and the range from $I_{min}+I_A \times 0.2$ or more to $I_{max}$ is determined as the portion of ferrite. Among the brightness data in the line profile length (straight line) obtained by the ling profile function, the line profile lengths having the brightness of $I_{min}+I_A \times 0.2$ or more to $I_{max}$ or less are integrated and divided by the line profile length (straight line) to determine the proportion of the ferrite portion in the internal part of the particle by the calculation. The same procedures are carried out for 30 particles, and the average is assumed to be the density of the internal part of the particle.

Making of the apparent density of conventional ferrite particles low has mainly been achieved by making ferrite particles porous only. Making of ferrite particles porous can be easily achieved by changing firing conditions in final firing. However, characteristic pores in porous material are uniformly formed in the whole region from the surface to the internal part. As a result, if the properties should be controlled by resin coating or resin impregnation, the control of properties is extremely difficult due to the large effect of the resin used in the coating or the impregnation because a large amount of the resin presents on the surface of the particles.

Although the form of the ferrite particles according to the present invention is similar to that of the conventional spherical particles at a first glance, the ferrite particles according to the present invention have different density between the outer shell structure (outer shell portion) and the internal part of the particle having a porous structure. More specifically, the ferrite particles has large pore volume due to the low density of the internal part of the ferrite particles and large pore diameter due to the high density of the outer shell portion. Next, the ferrite particles have the outer shell structure, the ferrite particles have lower apparent density in comparison with the conventional porous ferrite particles. In addition, as the outside of the ferrite particles are connected to the internal part through localized pores, the internal part of the particle can be impregnated with the suspension containing dispersed resin or functional nanoparticles and the surface exposed on the ferrite particle is maintained even having a low apparent density. As a result, the outer shell portion and the internal porous portion can have individual functions, and new properties which have not been achieved in conventional ferrite particles can be achieved.

The ferrite particles according to the present invention is preferable to contain 0.5 to 4 wt % of Mg and 3 to 20 wt % of Mn.

The ferrite particles according to the present invention is preferable to contain 47 to 70 wt % of Fe.

The ferrite particles according to the present invention is preferable to contain 0.5 to 4.5 wt % of Ti.

If the ferrite particles according to the present invention contain Mg, control of magnetization is made easy. If Mg content is less than 0.5 wt %, the effect of containing Mg is made poor and sufficient magnetization cannot be controlled. If Mg content exceeds 4 wt %, the magnetization decreases and using in applications based on magnetic properties is made difficult.

The ferrite particles according to the present invention containing Mn make control of magnetization and the electric resistivity easy. If Mn content is less than 3 wt %, the effect of containing Mn is made poor and the sufficient magnetization cannot be controlled. If Mn content exceeds 20 wt %, containing effect of Mn decreases because Mn content is close to the stoichiometry of Mn ferrite, and containing of Mn is no meaning. Containing of Mn achieves control of magnetization by firing temperature, even at a specific oxygen concentration.

Containing both elements of Mn and Mg is preferable from the viewpoint of precise control of firing temperature and magnetization. In other words, the magnetization of ferrite particles can be roughly controlled by the content of Mg, and the relation between firing temperature and magnetization can be controlled in more precise by the content of Mn.

If the ferrite particles contain Mg is used as a carrier for electrophotographic developer, a developer having good charging start composed of a ferrite carrier using the ferrite particles and full-color toners can be prepared. In addition, the electric resistivity can be made high. If Mg content is less than 0.5 wt %, sufficient effect of the containing Mg is not achieved and the electric resistivity decreases, and the image quality is made poor because of fogging generated, poor tone reproduction, and the like. In addition, if used as a carrier for electrophotographic developer, the point of the magnetic brush is hardened to cause the generation of image defects such as brush streak marks due to excessively high magnetization. On the other hand, if Mg content exceeds 4 wt %, not only the ferrite carrier scattering occurs due to lowered magnetization, but also the amount of moisture adsorbed increases due to the effect of hydroxyl group originating from Mg if the firing temperature is low, and worsen the environmental dependency of electric properties such as the charge amount and the electric resistivity.

If Fe content is less than 47 wt % in the ferrite particles according to the present invention, no outer shell structure is formed. On the other hand, if Fe content exceeds 70 wt %, no effect of containing Mg is achieved, and the ferrite particles might be substantially a magnetite.

The ferrite particles according to the present invention is preferable to contain 0.5 to 4.5 wt % of Ti. Ti has an effect of lowering the firing temperature, and not only reduce aggregated particles, but also achieves uniform and wrinkled surface properties. If Ti content is less than 0.5 wt % in the ferrite particles, no effect of containing Ti is achieved, and the ferrite particles prepared may not have the outer shell structure. If Ti content exceeds 4.5 wt %, the core-shell particles may be formed, but is not preferable because use in applications based on magnetic properties of the ferrite particles is made difficult.

The difference between the Ti content in the ferrite particles according to the present invention and the Ti content in ferrite particles without the outer shell structure, i.e., the difference in Ti content between the vicinity of the surface of particle and the internal part of particle, is preferable to be 0.5 to 4.5 wt %.

If difference in Ti content is less than 0.5 wt %, no outer shell structure can be formed due to the small coating amount of composite oxide particles. If difference exceeds 4.5 wt %, the magnetization tends to decrease, and is not preferable because use in applications based on magnetic properties is made difficult.

The Ti oxides contained in the outer shell structure can be confirmed by EDX elemental mapping analysis of the cross-sectional SEM sample. The Ti oxides include not only $TiO_2$ but also compounds of solid-solution; one or more elements constituting the matrix of ferrite particle such as Fe—Ti oxides, Mg—Ti oxides, Sr—Ti oxides, Mn—Ti oxides, Mg—Fe—Ti oxides, Mg—Mn—Ti oxides, Sr—Fe—Ti oxides, Sr—Mn—Ti oxides, Sr—Mg—Ti oxides, Fe—Mn—Ti oxides, Fe—Mn—Mg—Ti oxides, Sr—Mn—Mg—Ti oxides, Sr—Fe—Mg—Ti oxides, and Sr—Fe—Mn—Ti oxides.

The ferrite particles according to the present invention is preferable to contain 0 to 1.5 wt % of Sr. Sr not only contributes to adjusting the electric resistivity and the surface properties with an effect maintaining high magnetization, but also has an effect of enhancing the charging ability of ferrite particles. The effect is particularly large in the presence of Ti. If Sr content exceeds 1.5 wt %, the residual magnetization and the coercive force increase, but is not preferable because use in applications based on soft magnetic properties of the ferrite particles is made difficult.

<Determination of Content of Fe, Mg, Ti and Sr>

The content of Fe, Mg, Ti and Sr is determined as follows.

Ferrite particles (ferrite carrier core material) in an amount of 0.2 g are weighed and completely dissolved in 60 ml of pure water added 20 ml of 1 N hydrochloric acid and 20 ml of 1 N nitric acid with heating. The content of Fe, Mg, Ti and Sr in the aqueous solution prepared is determined with ICP analyzer (ICPS-1000IV manufactured by Shimadzu Corporation).

The ferrite particles according to the present invention are preferable to have the magnetization of 55 to 85 $Am^2/kg$ in the magnetic field applied of $5K \cdot 1000/4\pi \cdot A/m$, in the VSM examination. If the magnetization of ferrite particles is less than 55 $Am^2/kg$ at $5K*1000/4\pi \cdot A/m$, use in applications based on the magnetic properties of ferrite particles cannot be sufficiently achieved. On the other hand, the magnetization of ferrite particles within the composition according to the present invention never exceed 85 $Am^2/kg$ at $5K \cdot 1000/4\pi \cdot A/m$.

<Determination of Magnetic Properties>

The magnetic properties are examined by the vibrating sample magnetometer (model: VSM-C7-10A (manufactured by Toei Industry Co., Ltd.)). The cell with the inner diameter of 5 mm and the height of 2 mm is filled with the sample to be examined and set in the apparatus. In the examination, sweeping is carried out under the magnetic field applied up to $5K \cdot 1000/4\pi \cdot A/m$. Subsequently the magnetic field applied is reduced to draw the hysteresis curve on the recording paper. Based on the hysteresis curve, the magnetization under the magnetic field applied of $5K \cdot 1000/4\pi \cdot A/m$ is determined. The residual magnetization and the coercive force are calculated in the same manner.

The volume average particle diameter of the ferrite particles according to the present invention examined by the laser diffraction particle size distribution examiner is preferable to be 10 to 100 μm, more preferable to be 15 to 50 μm, most preferable to be 20 to 50 μm. If the volume average particle diameter of ferrite particles is less than 10 μm, the portion having low density in the internal part of the ferrite particle decreases relatively, and particles having sufficiently low apparent density may not be prepared. Although the core-shell particles having the volume average particle diameter exceeding 100 μm can be prepared, the diameter is preferable to be 100 μm or less from the viewpoint of reducing voids to densely fill the specified volume with the ferrite particles.

<Determination of Volume Average Particle Diameter>

The volume average particle diameter is determined by the laser diffraction/scattering method. A micro track particle size analyzer (Model 9320-X100) manufactured by Nikkiso Co., Ltd is used as the apparatus. The refractive index is assumed to be 2.42, and the examination is carried out under the environment at 25±5° C. and relative humidity of 55±15%. The volume average particle diameter (median diameter) refers to the cumulative 50% particle diameter under the sieve in the volume distribution mode. Water is used as dispersion medium.

BET specific surface area of the ferrite particles according to the present invention is preferable to be 0.2 to 1 $m^2/g$, more preferable to be 0.2 to 0.85 $m^2/g$.

BET specific surface area of less than the range is not preferable because the particles having the densely filled internal part may be formed without sufficient formation of the outer shell structure. If BET specific surface area exceeds the range, the porous ferrite particles without the outer shell structure may be prepared. Note that in determining BET specific surface area, the examination results may be affected by the moisture on the surface of ferrite particles as the sample for the examination. A pre-treatment is preferable to remove the moisture put on the surface of the sample as much as possible.

<Determination of BET Specific Surface Area>

The BET specific surface area is examined with BET specific surface area analyzer (Macsorb HM model 1208 (manufactured by Mountech Co.)). The sample in an amount of about 5 to 7 g is placed in the standard sample cell for the exclusive use in the specific surface area analyzer and is accurately weighed with an analytical balance, and the sample (ferrite particles) is set in an examination port to start the examination. The examination is carried out by the one-point method. After finishing the examination, the weight of the sample is inputted, and the BET specific surface area is automatically calculated. As a pre-treatment before examination, the sample in an amount of about 20 g is separately taken onto a medicine wrapping paper and then degassed to −0.1 MPa with a vacuum dryer. After reaching the degree of vacuum at −0.1 MPa or less, the sample is heated at 200° C. for 2 hours.

Environment: temperature at 10 to 30° C., relative humidity at 20 to 80%, without condensation.

The ferrite particles according to the present invention is preferable to have the electric resistivity of $5 \times 10^7$ to $1 \times 10^{11} \Omega$ at the applied voltage of 50 V for a 6.5-mm gap.

If the electric resistivity of the ferrite particles is less than $5 \times 10^7 \Omega$ at an applied voltage of 50 V with the 6.5-mm gap, the ferrite composition is close to magnetite or that the outer shell structure is insufficiently formed due to an insufficient amount of Ti contained. If the electric resistivity of the ferrite particles exceeds $1 \times 10^{11} \Omega$, Ti content on the surface of a ferrite particle is too much and the magnetization may be poor.

<Determination of Electric Resistivity>

The electric resistivity is determined as follows.

Non-magnetic parallel plate electrodes (10 mm by 40 mm) are opposed with the 6.5-mm gap, and the gap is filled with 200 mg of sample (ferrite particles) weighed. The magnet (surface magnetic flux density: 1500 Gauss, magnet area in contact with electrode: 10 mm by 30 mm) is attached to the parallel plate electrodes to hold the sample between the electrodes. Voltages of 50 V, 100 V, 250 V, 500 V and 1000 V are applied to examine the electric resistivity at each of the applied voltages with the insulation resistivity meter (SM-8210 manufactured by DKK-TOA Corporation).

The ferrite particles is preferable to have the pore volume of 0.06 to 0.2 ml/g (60 to 200 μl/g) and the peak pore diameter of 0.7 to 2 μm.

If the pore volume of the ferrite particles is less than 0.06 ml/g (60 μl/g), the apparent density of the ferrite particles is not low due to having small pores in the internal part of the particles. If the pore volume of ferrite particles exceeds 0.2 ml/g (200 μl/g), the apparent density is excessively low, and problems may arise in applications based on magnetic properties of the ferrite particles due to the poor magnetic force of the ferrite particles as a magnetic powder.

If the peak pore diameter of the ferrite particles exceeds 2 μm, the apparent density of the particle is not low, and sufficient properties cannot be achieved in applications utilizing the portion low density in the internal part of ferrite particles. If the peak pore diameter of the ferrite particles is less than 0.7 μm, the ferrite particles may be porous state without the outer shell structure, and use in applications based on separate functions between the internal part and the outer shell structure of the ferrite particle may be made difficult.

If the pore volume and the peak pore diameter are in the ranges, preferably lightweight ferrite particles without problems described above can be prepared.

<Determination of the Pore Diameter and the Pore Volume of Ferrite Particles>

The pore diameter and the pore volume of the ferrite particles are examined as follows. Mercury porosimeters Pascal 140 and Pascal 240 (manufactured by Thermo Fisher Scientific Inc.) are used in the examination. Using CD3P (for powder use) as dilatometer, the sample put in the commercially available gelatinous capsule having a plurality of open holes is placed in the dilatometer. The first run includes the successive steps of degassing with Pascal 140, filing with mercury, and carrying out the examination in the low-pressure region (0 to 400 kPa). In the second run, repeat the steps of degassing and performing the examination in the low-pressure region (0 to 400 kPa). After the second run, the total weight of the dilatometer, mercury, the capsule and the sample is examined. Subsequently, the examination in the high-pressure region (0.1 MPa to 200 MPa) is carried out with Pascal 240. Based on the amount of mercury press fitted in the examination in the high-pressure region, the pore volume, the pore diameter distribution, and the peak pore diameter of ferrite particles are determined. In the calculation for determining the pore diameter, the surface tension of mercury is assumed to be 480 dyn/cm and the contact angle is assumed to be 141.3°.

<Manufacturing Method of the Ferrite Particles According to the Present Invention>

The method of manufacturing the ferrite particles according to the present invention will be described below.

The method of manufacturing the ferrite particles according to the present invention is carried out as follows.

(Preparation of Particles for Ferrite Core Material)

The respective compounds of Fe, Mn and Mg, and the compounds of Sr, Ti according to needs are pulverized, mixed, calcined, and then pulverized with the rod mill, to prepare calcined ferrite powder.

The preferable composition of the calcined ferrite powder contains 45 to 68 wt % of Fe, 0.5 to 4 wt % of Mg, 3 to 22 wt % of Mn, 0.25 to 6 wt % of Ti, and 0 to 2 wt % of Sr, for example.

The calcined ferrite powder satisfying the composition range described above is coated with Ti compounds and then fired, to achieve various properties necessary and sufficient for ferrite particles corresponding to applications.

The calcined ferrite powder is added water and a dispersant, and a binder and the like according to needs are added to prepare the slurry. After adjusting viscosity of the slurry, granulation is carried out using the spray dryer. The particles are subjected to binder removing to prepare the uncoated ferrite particle. The binder removing is carried out at 600 to 1000° C.

The slurry particle diameter $D_{50}$ is preferable to be 0.5 to 4.5 μm. If the slurry particle diameter is in the range, the ferrite particles having the desired BET specific surface area can be manufactured. If the slurry particle diameter $D_{50}$ is less than 0.5 m, the specific surface area of the calcined ferrite particles increases excessively after pulverization, and firing proceeds excessively in firing of the ferrite particles coated with $TiO_2$ particles for coating, and the manufactured ferrite particles may not achieve a desired BET specific surface area. If the slurry particle diameter $D_{50}$ exceeds 4.5 μm, desired ferrite particles may not be manufactured because formation of the outer shell structure is insufficient even if the ferrite particles are coated with $TiO_2$ particles for coating and fired.

A slurry particle diameter in the range may be achieved by controlling the pulverization time in preparation of the slurry for the granulation, selecting the pulverization medium to achieve the intended slurry particle diameter and particle size distribution, or classifying the raw material particles in the slurry by using the wet cyclone. If the wet cyclone is used, the solid content in the slurry is different after classification, and the solid content should be adjusted. However, as the intended slurry diameter can be achieved in a short time, the wet cyclone may be used in combination with the control of the pulverization time.

The volume average particle diameter of $TiO_2$ particles for coating is preferable to be 0.05 to 3 µm. If the diameter is less than 0.05 µm, the $TiO_2$ particles for coating tend to aggregate when the fine particles are stack on the surface of an uncoated ferrite particle. As a result, the formed coating layer tends to be irregular even if the surface of the uncoated ferrite particle is coated with a desired amount of the $TiO_2$ particles, and the ferrite particles including a part without the outer shell structure may be prepared. If the diameter exceeds 3 µm, uniform sticking on the uncoated ferrite particle is made hard, and the ferrite particle including a part without the outer shell structure may be prepared.

Although the volume average particle diameter may affects, the content of the $TiO_2$ particles for coating is preferable to be 0.8 to 7 wt % relative to the uncoated ferrite particle. If the content is less than 0.8 wt %, a sufficient electric resistivity cannot be achieved after final firing. If the content exceeds 7 wt %, the $TiO_2$ particles for coating of ferrite not stack on the uncoated ferrite particle may aggregate each other to form the ferrite particle with low magnetization. This may cause problems in applications based on magnetic properties of the ferrite particles.

(Preparation of the Ferrite Particles)

The uncoated ferrite particle prepared are added $TiO_2$ particles for coating and mixed with the mixing mill to prepare the raw material for ferrite particles. The raw material for ferrite particles is fired to at 850 to 1230° C. under the inert atmosphere or the weak oxidizing atmosphere such as nitrogen atmosphere or the mixed gas atmosphere of nitrogen and oxygen with an oxygen concentration of 3 vol % or less.

The fired product is pulverized and classified to prepare ferrite particles. Using a conventional classification method such as wind classification, mesh filtration and sedimentation, the particle size is adjusted to the desired particle diameter. With a dry collection, the collection can be carried out by using a cyclone or the like.

Thus, the ferrite particles according to the present invention having each of the properties can be prepared.

In the ferrite particles according to the present invention, the surface of the $TiO_2$ particles for coating may be surface treated for electrification to achieve easy dispersibility. If the surface treatment for electrification is carried out, aggregation of $TiO_2$ particles reduces, and easy attaching of $TiO_2$ particles for coating tends to be achieved before final firing. If the surface treatment agent having the charging polarity reverse to the charging polarity of the uncoated ferrite particle is used, the effect to prevent detachment of $TiO_2$ particles for coating stack on the uncoated ferrite particle before final firing can be achieved.

The method of sticking the $TiO_2$ particles for coating on the surface of the uncoated ferrite particle before final firing is proposed as described above. If dry process of sticking the $TiO_2$ particles for coating without pre-treatment for electrification on the surface of the uncoated ferrite particle before final firing is employed, the $TiO_2$ particles for coating may severely aggregate and is difficult to stick on the uncoated ferrite particle or results large deviation in the composition due to the sticking of large aggregates. As a result, the properties of the ferrite particles prepared after final firing may be poor.

If the wet process is employed for coating of the $TiO_2$ particles for coating on the surface of uncoated ferrite particle before final firing, the process requires removal of the solvent for each of the raw materials of the coated ferrite particles. So, the process results expensive cost due to a large-scale process. As the dry process of coating the uncoated ferrite particle with the $TiO_2$ particles for coating requires just the surface treatment of the $TiO_2$ particles for coating, the process can be easily carried out with less increased cost.

<Ferrite Carrier According to the Present Invention>

The ferrite carrier for an electrophotographic developer according to the present invention is manufactured by coating and/or impregnating the ferrite carrier core material (ferrite particles) with a resin.

The amount of the coated resin in the resin-coated ferrite carrier for an electrophotographic developer according to the present invention is preferable to be 0.5 to 4 wt % of the ferrite carrier core material. If the amount of the coated resin is less than 0.5 wt %, forming of the uniform coating layer on the surface of the ferrite carrier is difficult. If the amount of the coated resin exceeds 4 wt %, the ferrite carrier aggregate to each other to make productivity poor, reduces yield, and properties of the developer such as the fluidity and the charge amount fluctuate in a practical machine.

The amount of the impregnated resin in the resin impregnated ferrite carrier for an electrophotographic developer according to the present invention is preferable to be 4 to 20 wt % of the ferrite carrier core material. If the amount of the impregnated resin is less than 4 wt %, the internal part of the particle cannot be sufficiently impregnated with the resin, and image defects such as white spots may generate due to insulation breakdown under applied high electric field. If the amount of the impregnated resin exceeds 20 wt %, the excessive amount of the resin overflows to the surface, and the image density may decrease due to the excessively high electric resistivity.

The resin for coating and/or impregnating can be appropriately selected depending on the toner used in combination, the operating environment, and the like. Examples include a fluorine-contained resin, an acrylic resin, an epoxy resin, a polyamide resin, a polyamide-imide resin, a polyester resin, an unsaturated polyester resin, a urea resin, a melamine resin, an alkyd resin, a phenol resin, a fluorinated acrylic resin, an acrylic styrene resin, and a silicone resin, or a modified silicone resin modified with each of an acrylic resin, a polyester resin, an epoxy resin, a polyamide resin, a polyamide-imide resin, an alkyd resin, a urethane rein, and a fluorine-contained resin, though not specifically limited. An acrylic resin, a silicone resin or a modified silicone resin is most preferably used in the present invention.

To control the electric resistivity, the charge amount and the charging rate of the ferrite carrier, a conductive agent may be contained in the resin for coating and/or impregnating. As the own electric resistivity of the conductive agent is low, an excessive content tends to cause a sudden electric charge leakage. The content of the conductive agent should be 0 to 15 wt %, preferably 0 to 10 wt %, and more preferably 0 to 8 wt %, relative to the solid content in the resin for coating and/or impregnating. Examples of the conductive agent include conductive carbon, oxides such as titanium oxide and tin oxide, and various organic conductive agents.

As an electric charge controlling agent may be contained also in the resin for coating and/or impregnating. Examples of the electric charge controlling agent include various electric charge controlling agents commonly used for toners, various silane coupling agents, and inorganic fine particles. The reason is that if the exposed surface of the core material is controlled to be relatively small by forming of a coated layer, the electric charging ability may reduce. However, the addition of various electric charge controlling agents or a silane coupling agent can control the electric charging ability. The types of the electric charge controlling agent and the coupling agent used are not specifically limited, and electric charge controlling agents such as a nigrosine dye, a quaternary ammonium salt, an organic metal complex, and a metal-containing mono-azo dye, an aminosilane coupling agent and a fluorine silane coupling agent are preferred. The inorganic fine particles preferable to be used for electric charge control may be made of any substance having a biased electronegativity, and silica or the like.

The resin coating and/or impregnating method may be a known method such as brush application, spray drying with fluid bed, rotary drying, and immersion drying by versatile mixer. To improve the coating ratio, a method using a fluid bed is preferable.

If the ferrite carrier core material is baked after coating and/or impregnating the resin, any of external heating or internal heating is applicable. For example, any of a fixed or fluidized electric furnace, a rotary electric furnace and a burner furnace, or microwaves may be used for the baking. If UV-curing resin is applied, a UV heating unit is used. The baking temperature of a resin should be equal to or higher than the melting point or the glass transition point. However, the temperature is different depending on the resin used. For a thermosetting resin or a condensation cross-linking resin, the baking temperature should be a point where sufficient curing is achieved.

<Electrophotographic Developer According to the Present Invention>

The electrophotographic developer according to the present invention will be described as follows.

The electrophotographic developer according to the present invention is composed of the ferrite carrier for an electrophotographic developer described above and a toner.

Two types of toner particles are applicable to constitute the electrophotographic developer according to the present invention: pulverized toner particles manufactured by a pulverizing method and polymerized toner particles manufactured by a polymerization method. In the present invention, toner particles prepared by any of the methods may be used.

The pulverized toner particles may be manufactured by the steps of sufficiently mixing a binder resin, an electric charge control agent and a coloring agent with a mixer such as Henschel mixer, melt-kneading the mixture with the twin-screw extruder, cooling, pulverizing and classifying the extruded material, adding an external additive, and mixing with the mixer, for example.

Examples of the binder resin constituting the pulverized toner particles include polystyrene, chloropolystyrene, a styrene-chlorostyrene copolymer, a styrene-acrylate copolymer, a styrene-methacrylic acid copolymer, a rosin-modified maleic acid resin, an epoxy resin, a polyester resin and a polyurethane resin, but are not specifically limited. These may be used alone or in combination.

Any electric charge control agent may be used. Examples of the agent for positively electric charged toners include a nigrosine dye and a quaternary ammonium salt. Examples of the agent for negatively electric charged toners include a metal-containing mono-azo dye.

As the coloring agent (coloring material), conventionally known dyes and pigments may be used. Examples include carbon black, phthalocyanine blue, permanent red, chrome yellow, phthalocyanine green. Further, external additives suitable for the toner particles such as silica powder and titania for improving the fluidity and the aggregation resistance of the toner.

The polymerized toner particles are manufactured by a known method such as suspension polymerization, emulsion polymerization, emulsion aggregation, ester elongation polymerization and phase inversion emulsion. Such polymerized toner particles are manufactured by the following steps. A colored dispersion dispersed a coloring agent in water with a surfactant, polymerizable monomer, a surfactant and a polymerization initiator in an aqueous medium are mixed and stirred to prepare polymerizable monomer emulsified and dispersed in the aqueous medium. Then, the emulsion is polymerized with stirring and mixing followed by adding a salting-out agent to salt out polymer particles. After filtration, rinsing and drying the particles prepared by the salting out, the polymerized toner particles are prepared. Then, the toner particles dried according to needs are added an external additive for achievement of functions.

In manufacturing of the polymerized toner particles, a fixation improver, an electric charge control agent may be contained in addition to the polymerizable monomer, the surfactant, the polymerization initiator and the coloring agent to control and/or improve the various properties of the polymerized toner particles. Furthermore, a chain transfer agent for controlling the molecular weight of a polymer may be used to improve the dispersibility of the polymerizable monomer in an aqueous medium.

Examples of the polymerizable monomer used in the manufacturing of the polymerized toner particles include styrene and a derivative thereof, ethylene-unsaturated mono-olefins such as ethylene and propylene, vinyl halogenides such as vinyl chloride, vinyl esters such as vinyl acetate, and α-methylene aliphatic monocarboxylates such as methyl acrylate, ethyl acrylate, methyl methacrylate, ethyl methacrylate, 2-ethylhexyl methacrylate, dimethylamino acrylate, and diethylamino methacrylate, but is not specifically limited.

As the coloring agent (coloring material) used in preparation of the polymerized toner particles, conventionally known dyes and pigments may be used. Example include carbon black, phthalocyanine blue, permanent red, chrome yellow, phthalocyanine green. In addition, these coloring agents may be subjected to surface modification using a silane coupling agent, a titanium coupling agent or the like.

As the surfactant used in the manufacturing of the polymerized toner particles, an anionic surfactant, a cationic surfactant, an amphoteric surfactant, or a non-ionic surfactant may be used.

Examples of the anionic surfactant include a fatty acid salt such as sodium oleate and castor oil, an alkyl sulfate such as sodium lauryl sulfate and ammonium lauryl sulfate, an alkyl benzene sulfonate such as sodium dodecyl benzene sulfonate, an alkyl naphthalene sulfonate, an alkyl phosphate, a naphthalene sulfonic acid-formaldehyde condensate, and a polyoxyethylene alkyl sulfate. Examples of the non-ionic surfactant include a polyoxyethylene alkyl ether, a polyoxyethylene fatty acid ester, a sorbitan fatty acid ester, a polyoxyethylene alkyl amine, glycerol, a fatty acid ester, and an oxyehtylene-oxypropylene block polymer. Examples of the cationic surfactant include an alkyl amine salt such as lauryl amine acetate, a quaternary ammonium salt such as lauryl tri-methyl ammonium chloride and stearyl trimethyl ammonium chloride. Examples of the amphoteric surfactant include an amino carboxylate and an alkyl amino acid.

Typical amount of the surfactants is 0.01 to 10 wt % relative to the polymerizable monomer. The surfactant influences on the dispersion stability of a monomer and the environment-dependency of the polymerized polymer prepared. The amount in the range is preferable from the viewpoints of securing the dispersion stability of the monomer and reducing the environment-dependency of the polymerized toner particles.

To manufacture the polymerized toner particles, a polymerization initiator is usually used. Two types of polymerization initiators: a water-soluble polymerization initiator and an oil-soluble polymerization initiator and any one of the polymerization initiator can be used in the present invention. Examples of the water-soluble polymerization initiator include a persulfate such as potassium persulfate and ammonium persulfate, and a water-soluble peroxide compound. Examples of the oil-soluble polymerization initiator include an azo compound such as azo-bis-isobutylonitrile and an oil-soluble peroxide compound.

If a chain transfer agent is used in the present invention, examples of the chain transfer agent include mercaptans such as octyl mercaptan, dodecyl mercaptan, and tert-dodecyl mercaptan, and carbon tetra-bromide.

If the polymerized toner particles used in the present invention contain a fixation improver, examples of the fixation improver include a natural wax such as carnauba wax and an olefin wax such as polypropylene and polyethylene.

If the polymerized toner particles used in the present invention contain an electric charge control agent, the electric charge control agent is not specifically limited, and examples include a nigrosine dye, a quaternary ammonium salt, an organic metal complex, and a metal-containing mono-azo dye.

If the polymerized toner particles used in the present invention include the external additive to improve the fluidity, examples of include silica, titanium oxide, barium titanate, fluorine-contained resin fine particles, and acrylic resin fine particles, which may be used alone or in combination.

Examples of the salting-out agent used in separating polymerized particles from an aqueous medium include a metal salt such as magnesium sulfate, aluminum sulfate, barium chloride, magnesium chloride, calcium chloride and sodium chloride.

Volume average particle diameter of the toner particles manufactured as described above should be 2 to 15 µm, preferable to be 3 to 10 µm. The polymerized toner particles have higher uniformity than the pulverized toner particles. If the particle diameter of toner particles is less than 2 µm, fogging and toner scattering tend to occur due to reduction in charging ability. If the particle diameter exceeds 15 µm, image quality may deteriorates.

The electrophotographic developer is manufactured by mixing the ferrite carrier and the toner manufactured as described above. The mixing ratio between the ferrite carrier and the toner, i.e. toner density, is preferable to be 3 to 15 wt %. If the toner density is less than 3 wt %, the desired image density is hardly achieved. If the toner density exceeds 15 wt %, toner scattering and fogging tend to occur.

The electrophotographic developer according to the present invention can be used as a refill developer. On this occasion, the mixing ratio between the ferrite carrier and the toner, i.e. toner density, is preferable to be 100 to 3000 wt %.

The electrophotographic developer according to the present invention manufactured as described above can be used in a digital copier, printer, fax, printing machine or the like, with a developing method in which a static latent image formed on a latent image retainer having an organic photoconductor layer is reversal-developed with a magnetic brush of a two-component developer including a toner and a ferrite carrier under a biased electric field. The electrophotographic developer is also applicable to a full-color machine using an alternating electric field that overlaps an AC bias on a DC bias in application of the development bias on the static latent image-side from a magnet brush.

The present invention will be more specifically described with reference to Examples and comparative examples as follows.

EXAMPLE

Example 1

<Preparation of Ferrite Particles>

100 mol of $Fe_2O_3$, 10 mol of $MgCO_3$, 13.3 mol of $Mn_3O_4$ and 1 mol of $SrCO_3$ were weighed and 1.35 wt % of carbon black as reducing agent relative to the raw material weight was added and mixed and pulverized, and then pelletized with the roller compactor. The pellets prepared were calcined in the rotary calcination furnace at 980° C. under the nitrogen atmosphere with the oxygen concentration of 0 vol %. The calcined material was pulverized with the rod mill to prepare the calcined ferrite powder for the ferrite core material.

The calcined ferrite powder for the ferrite core material was pulverized for 1 hour with the wet bead mill. As the binder, PVA was added in the amount of 1 wt % relative to the slurry solid content, and the polycarboxylic acid-based dispersant was added to adjust viscosity of the slurry 2 to 3 poise. On this occasion, the slurry particle diameter $D_{50}$ was 3.259 µm.

The pulverized slurry prepared was granulated and dried with the spray dryer, and subjected to the binder removing treatment at 850° C. with the rotary kiln under the nitrogen atmosphere with the oxygen concentration of 0 vol %, to prepare the uncoated ferrite particle for the ferrite core material.

4 wt % of the $TiO_2$ particles for coating relative to the uncoated ferrite particle for a ferrite core material was added, mixed and stirred for 10 minutes with the mixing mill. The aggregate of the mixture was loosened with the 80-mesh vibrating sieve to prepare the raw material for ferrite particles.

The raw material for ferrite particles prepared was final fired at 1010° C. for 4 hours under the nitrogen atmosphere with the oxygen concentration of 0 vol % in the electric furnace. The fired material was de-agglomerated and classified to prepare the ferrite particles.

Example 2

The ferrite particles were prepared in the same manner as in Example 1, except that 100 mol of $Fe_2O_3$, 5 mol of MgCO₃, 26.6 mol of Mn₃O₄, and 0 mol of SrCO₃ were weighed as the ferrite raw material.

Example 3

The ferrite particles were prepared in the same manner as in Example 1, except that 100 mol of Fe₂O₃, 20 mol of MgCO₃, 6.65 mol of Mn₃O₄, and 0 mol of SrCO₃ were weighed as the ferrite raw material.

Example 4

The ferrite particles were prepared in the same manner as in Example 1, except that 100 mol of Fe₂O₃, 5 mol of MgCO₃, 5 mol of Mn₃O₄, and 0 mol of SrCO₃ were weighed as the ferrite raw material.

Example 5

The ferrite particles were prepared in the same manner as in Example 1, except that 100 mol of Fe₂O₃, 20 mol of MgCO₃, 26.6 mol of Mn₃O₄, and 0 mol of SrCO₃ were weighed as the ferrite raw material.

Example 6

The ferrite particles were prepared in the same manner as in Example 1, except that 0 mol of SrCO₃ and 2.5 wt % of TiO₂ particles for coating relating to the particles for the ferrite core material were added.

Example 7

The ferrite particles were prepared in the same manner as in Example 1, except that 0 mol of SrCO₃ and 5 wt % of TiO₂ particles for coating relative to the particles for a ferrite core material was added.

Example 8

The ferrite particles were prepared in the same manner as in Example 6, except that the final firing temperature was 950° C.

Example 9

The ferrite particles were prepared in the same manner as in Example 6, except that the final firing temperature was 1050° C.

Comparative Example 1

The ferrite particles were prepared in the same manner as in Example 1, except that the amount of SrCO₃ was 0 mol and the final firing temperature was 920° C.

Comparative Example 2

The ferrite particles were prepared in the same manner as in Example 1, except that the amount of SrCO₃ was 0 mol and no TiO2 particle for coating was added to the uncoated ferrite particle for a ferrite core material.

Comparative Example 3

The ferrite particles were prepared in the same manner as in Example 1, except that the amount of SrCO₃ was 0 mol and the final firing temperature was 1165° C.

Table 1 shows the molar ratio of the raw materials charged, the amount of carbon, the calcination conditions (calcination temperature and calcination atmosphere), the final granulation conditions (slurry particle diameter and amount of PVA added), the binder removing conditions (treatment temperature and treatment atmosphere), the mixing conditions of TiO2 (amount added and mixing conditions) and the final firing conditions (final firing temperature and final firing atmosphere) in Examples 1 to 9 and Comparative Examples 1 to 3. Table 2 shows the composition, the magnetic properties (magnetization, residual magnetization and coercive force) and the shape (cross-sectional shape, proportion of the portion having the outer shell structure in the length of circumference, thickness of the portion having the outer shell structure, and proportion of ferrite portion in internal of particle) of the ferrite particles prepared. Table 3 shows the powder properties (BET specific surface area, average particle diameter, apparent density, true density, pore volume and peak pore diameter) and the electric resistance of 6.5 mm-gap (50 V, 100 V, 250 V, 500 V and 1000 V) of the ferrite particles in Examples 1 to 9 and Comparative Examples 1 to 3 are shown. The examination methods are as described above.

TABLE 1

| | Ratio of raw material charged (mol) | | | | | Amount of carbon *1 (wt %) | Calcination condition Temperature (° C.) | Calcination condition Atmosphere (vol %) | Final granulation condition Slurry particle diameter ($D_{50}$) (μm) |
|---|---|---|---|---|---|---|---|---|---|
| | Fe₂O₃ | MgCO₃ | Mn₃O₄ | TiO₂ | SrCO₃ | | | | |
| Example 1 | 100 | 10 | 13.3 | 0 | 1 | 1.35 | 980 | 0 | 3.259 |
| Example 2 | 100 | 5 | 26.6 | 0 | 0 | 1.35 | 980 | 0 | 3.245 |
| Example 3 | 100 | 20 | 6.65 | 0 | 0 | 1.35 | 980 | 0 | 3.268 |
| Example 4 | 100 | 5 | 5 | 0 | 0 | 1.35 | 980 | 0 | 3.229 |
| Example 5 | 100 | 20 | 26.6 | 0 | 0 | 1.35 | 980 | 0 | 3.242 |
| Example 6 | 100 | 10 | 13.3 | 0 | 0 | 1.35 | 980 | 0 | 3.231 |
| Example 7 | 100 | 10 | 13.3 | 0 | 0 | 1.35 | 980 | 0 | 3.269 |
| Example 8 | 100 | 10 | 13.3 | 0 | 0 | 1.35 | 980 | 0 | 3.24 |

TABLE 1-continued

| | | | | | | | | | |
|---|---|---|---|---|---|---|---|---|---|
| Example 9 | 100 | 10 | 13.3 | 0 | 0 | 1.35 | 980 | 0 | 3.274 |
| Comparative Example 1 | 100 | 10 | 13.3 | 0 | 0 | 1.35 | 980 | 0 | 3.247 |
| Comparative Example 2 | 100 | 10 | 13.3 | 0 | 0 | 1.35 | 980 | 0 | 3.236 |
| Comparative Example 3 | 100 | 10 | 13.3 | 0 | 0 | 1.35 | 980 | 0 | 3.228 |

| | Final granulation condition | Binder removing condition | | $TiO_2$ mixing condition | | Final firing condition | |
|---|---|---|---|---|---|---|---|
| | Amount of PVA added (10 wt % aqueous solution) | Temperature (° C.) | Atmosphere (vol %) | Amount added (wt %)*2 | Time (min) | Firing temperature (° C.) | Atmosphere (vol %) |
| Example 1 | 1 | 850 | 0 | 4 | 10 | 1010 | 0 |
| Example 2 | 1 | 850 | 0 | 4 | 10 | 1010 | 0 |
| Example 3 | 1 | 850 | 0 | 4 | 10 | 1010 | 0 |
| Example 4 | 1 | 850 | 0 | 4 | 10 | 1010 | 0 |
| Example 5 | 1 | 850 | 0 | 4 | 10 | 1010 | 0 |
| Example 6 | 1 | 850 | 0 | 2.5 | 10 | 1010 | 0 |
| Example 7 | 1 | 850 | 0 | 5 | 10 | 1010 | 0 |
| Example 8 | 1 | 850 | 0 | 2.5 | 10 | 950 | 0 |
| Example 9 | 1 | 850 | 0 | 2.5 | 10 | 1050 | 0 |
| Comparative Example 1 | 1 | 850 | 0 | 4 | 10 | 920 | 0 |
| Comparative Example 2 | 1 | 850 | 0 | 0 | 10 | 1010 | 0 |
| Comparative Example 3 | 1 | 850 | 0 | 4 | 10 | 1165 | 0 |

*1: Proportion based on the weight of raw material mixture
*2Weight relative to particles for ferrite core material

TABLE 2

| | Composition of ferrite particle (ICP) (wt %) | | | | | Magnetic properties at $5 K \cdot 1000/4\pi \cdot A/m$ (VSM) | | | Cross-sectional shape (SEM) | Shape of ferrite particle | | |
|---|---|---|---|---|---|---|---|---|---|---|---|---|
| | | | | | | Magnetization | Residual magnetization | Coercive force | | Proportion of portion having the outer shell structure in circumferential length (%) | Thickness of portion having the outer shell structure (μm) | Proportion of ferrite portion in internal part of particle (%) |
| | Fe | Mg | Mn | Ti | Sr | ($Am^2$/kg) | ($Am^2$/kg) | (A/m) | | | | |
| Example 1 | 56.36 | 1.23 | 11.06 | 1.95 | 0.59 | 72.66 | 3.27 | 35.97 | Core-shell form | 92 | 2.42 | 61 |
| Example 2 | 49.51 | 0.54 | 19.43 | 1.95 | 0.00 | 74.30 | 3.34 | 37.39 | Core-shell form | 90 | 1.87 | 55 |
| Example 3 | 60.41 | 2.63 | 5.43 | 1.95 | 0.00 | 67.63 | 3.04 | 33.29 | Core-shell form | 95 | 2.65 | 54 |
| Example 4 | 64.24 | 0.70 | 4.74 | 1.95 | 0.00 | 77.70 | 3.5 | 38.45 | Core-shell form | 96 | 2.53 | 58 |
| Example 5 | 48.01 | 2.09 | 11.84 | 1.95 | 0.00 | 66.64 | 3 | 32.78 | Core-shell form | 85 | 2.16 | 52 |
| Example 6 | 57.66 | 1.25 | 11.31 | 1.24 | 0.00 | 76.28 | 3.43 | 38.61 | Core-shell form | 96 | 2.33 | 65 |
| Example 7 | 56.50 | 1.23 | 11.09 | 2.42 | 0.00 | 71.08 | 3.2 | 35.83 | Core-shell form | 98 | 3.65 | 49 |
| Example 8 | 57.66 | 1.25 | 11.31 | 1.24 | 0.00 | 73.18 | 3.81 | 42.5 | Core-shell form | 95 | 2.4 | 73 |
| Example 9 | 57.66 | 1.25 | 11.31 | 1.24 | 0.00 | 77.66 | 3.05 | 29.3 | Core-shell form | 94 | 2.59 | 45 |
| Comparative Example 1 | 56.96 | 1.24 | 11.18 | 1.95 | 0.00 | 68.38 | 4.23 | 46.22 | Porous | Examination impossible* | Examination impossible* | 73 |
| Comparative Example 2 | 58.87 | 1.28 | 11.55 | 0.00 | 0.00 | 81.70 | 3.68 | 40.3 | Porous | Examination impossible* | Examination impossible* | 65 |
| Comparative Example 3 | 56.96 | 1.24 | 11.18 | 1.95 | 0.00 | 78.56 | 2.98 | 32.31 | Granular | Examination impossible* | Examination impossible* | 96 |

*Without the outer shell structure.

TABLE 3

| | Properties of ferrite particles | | | | | | | | | | |
|---|---|---|---|---|---|---|---|---|---|---|---|
| | BET specific surface area | Average particle diameter | Apparent density | True density | Pore volume | Peak pore diameter | Electric resistivity (6.5-mm Gap) (Ω) | | | | |
| | ($m^2/g$) | (μm) | ($g/cm^3$) | ($g/cm^3$) | (μl/g) | (μm) | 50 V | 100 V | 250 V | 500 V | 1000 V |
| Example 1 | 0.3413 | 29.66 | 1.23 | 4.69 | 131.220 | 0.992 | $2.9 \times 10^9$ | $1.3 \times 10^9$ | $5.4 \times 10^8$ | $2.4 \times 10^7$ | Examination impossible |
| Example 2 | 0.3653 | 29.54 | 1.42 | 4.66 | 137.330 | 0.948 | $8.5 \times 10^8$ | $7.0 \times 10^8$ | $9.5 \times 10^7$ | $6.5 \times 10^6$ | Examination impossible |
| Example 3 | 0.3005 | 29.32 | 1.16 | 4.72 | 120.490 | 1.080 | $3.4 \times 10^9$ | $1.8 \times 10^9$ | $6.4 \times 10^8$ | $3.6 \times 10^7$ | Examination impossible |
| Example 4 | 0.392 | 29.60 | 1.35 | 4.78 | 143.980 | 0.904 | $7.8 \times 10^9$ | $4.3 \times 10^8$ | $2.2 \times 10^6$ | Examination impossible | Examination impossible |
| Example 5 | 0.2926 | 29.29 | 1.51 | 4.63 | 118.360 | 1.100 | $5.6 \times 10^9$ | $3.8 \times 10^9$ | $8.7 \times 10^8$ | $6.2 \times 10^7$ | Examination impossible |
| Example 6 | 0.3823 | 29.74 | 1.21 | 4.73 | 141.580 | 0.919 | $5.8 \times 10^7$ | $3.8 \times 10^7$ | $2.7 \times 10^6$ | Examination impossible | Examination impossible |
| Example 7 | 0.3374 | 29.45 | 1.18 | 4.70 | 130.210 | 1.000 | $1.5 \times 10^{10}$ | $8.5 \times 10^9$ | $7.5 \times 10^7$ | Examination impossible | Examination impossible |
| Example 8 | 0.4724 | 29.58 | 1.01 | 4.73 | 163.150 | 0.798 | $9.0 \times 10^7$ | $6.4 \times 10^7$ | $2.0 \times 10^6$ | Examination impossible | Examination impossible |
| Example 9 | 0.2569 | 29.71 | 1.62 | 4.73 | 108.480 | 1.200 | $3.5 \times 10^9$ | $2.1 \times 10^9$ | $7.2 \times 10^8$ | $1.4 \times 10^7$ | Examination impossible |
| Comparative Example 1 | 0.5766 | 29.42 | 0.97 | 4.86 | 86.460 | 0.498 | $3.8 \times 10^7$ | $6.9 \times 10^6$ | Examination impossible | Examination impossible | Examination impossible |
| Comparative Example 2 | 0.4373 | 29.42 | 1.09 | 4.91 | 74.920 | 0.840 | $1.3 \times 10^7$ | $7.5 \times 10^6$ | $1.6 \times 10^6$ | Examination impossible | Examination impossible |
| Comparative Example 3 | 0.0857 | 29.33 | 2.16 | 4.86 | 10.990 | 0.718 | $6.2 \times 10^8$ | $3.5 \times 10^8$ | $8.5 \times 10^7$ | $2.5 \times 10^7$ | $7.6 \times 10^6$ |

As shown in Table 2, the ferrite particles prepared in Examples 1 to 9 have the outer shell structure.

In contrast, ferrite particles prepared in Comparative Example 1 have no outer shell structure due to the low firing temperature, even the porous structure is formed.

The ferrite particles prepared in Comparative Example 2 have no outer shell structure due to not having added $TiO_2$ particle for coating to the particles for a ferrite core material.

The ferrite particles prepared in Comparative Example 3 have no outer shell structure due to the high firing temperature.

Example 10

Relative to 100 parts by weight of the ferrite particles (ferrite carrier core material) prepared in Example 1, the resin solution having the solid resin content of 6.5 parts by weight was prepared by diluting the polyamide-imide resin (HPC-1000 manufactured by Hitachi Chemical Co., Ltd.) with water. The resin solution and the ferrite carrier core material were mixed and stirred with the versatile mixer to prepare the mixture. The mixture was baked for 2 hours with the hot air dryer at 180° C. to finish the resin impregnated ferrite carrier core material. Then, the aggregated resin impregnated ferrite carrier core material were de-agglomerated to prepare the resin impregnated ferrite particles (a carrier).

Example 11

Resin impregnated ferrite particles were prepared in the same manner as in Example 10, and the resin solution including 1 part by weight of a polyamide-imide resin relative to 100 parts by weight of the resin impregnated ferrite particles was prepared. The resin impregnated ferrite particles were coated with the resin with the fluidized bed coating device, and the mixture was baked for 2 hours with the hot air dryer at 180 □ C to prepare the resin impregnated ferrite particles coated with the resin. Then, the aggregated resin impregnated ferrite particles coated with the resin were de-agglomerated to prepare the resin-impregnated and the resin-coated ferrite carrier.

Example 12

Relative to 100 parts by weight of the ferrite carrier core material (ferrite particles) prepared in Example 1, a resin solution with a polyamide-imide resin content of 2 parts by weight was prepared. The ferrite particles were coated with the resin with the fluidized bed coating device, and the resulted mixture was baked for 2 hours with the hot air dryer at 180° C. to prepare the ferrite particles coated with the resin. Then, the aggregated ferrite particles coated with the resin were de-agglomerated to prepare the resin-coated ferrite carrier.

Table 4 shows the ferrite carrier core material (ferrite particles) used for preparing the ferrite carrier in Examples 10 to 12, the conditions for impregnating the resin (impregnated resin, amount of resin impregnated, device for impregnating the resin) and curing conditions (temperature and time), coating conditions (coated resin, amount of resin coated, and coating device) and curing conditions. Table 5 shows the electric charge amount of the carrier prepared, the electric resistivity of 6.5-mm gap (50V, 100 V, 250 V, 500 V and 1000 V), the apparent density, and the magnetic properties in the magnetic field applied of 5K·1000/4π·A/m. The method of examining the electric charge amount shown in Table 5 is as follows. The other examination methods were as described above.

(Electric Charge Amount of the Ferrite Carrier)

The sample (ferrite carrier) and the commercially available negative polarity toner having the average particle diameter of about 5.5 μm used in a full-color printer was weighed to make the toner density 6.5 wt % (toner weight=3.25 g, ferrite carrier weight=46.75 g). The weighed ferrite carrier and the toner were exposed to the environments described below for 12 hours or more. Then, the ferrite carrier and the toner were put in the 50-cc glass bottle and stirred for 30 minutes at the rotational speed of 100 rpm.

The device for examining the electric charge amount is composed of the magnet roll having magnets (magnetic flux density: 0.1 T) with N poles and S poles in total of 8 poles alternately arranged inside the aluminum made cylindrical element tube having the diameter of 31 mm and the length of 76 mm (hereinafter referred to as the sleeve), and the cylindrical electrode arranged around the outer periphery of the sleeve with the 5.0-mm gap to the sleeve.

0.5 g of developer was uniformly stack on the sleeve, the inner magnet roll was rotated at 100 rpm with the fixed sleeve, and DC voltage of 2000 V was applied between the outer electrode and the sleeve for 60 seconds to transfer the toner to the cylindrical electrode. The electrometer (manufactured by Keithley Instruments, insulation resistivity meter model: 6517A) was connected to the cylindrical electrode to measure the electric charge transferred from the toner.

After 60 seconds, the applied voltage was cut off and stop the rotation of the magnet roll. The cylindrical electrode was removed to determine the weight of the toner transferred to the cylindrical electrode.

The electric charge amount was calculated from the determined electric charge and the weight of the transferred toner.

The environment conditions were as follows.

Normal temperature/normal humidity (N/N) is temperature of 20 to 25° C. and relative humidity of 50 to 60%

Low temperature/low humidity (L/L) is temperature of 10 to 15° C. and relative humidity of 10 to 15%

High temperature/high humidity (H/H) is temperature of 30 to 35° C. and relative humidity of 80 to 85%

TABLE 4

| | | Resin impregnating conditions | | | | | Coating conditions | | | |
| | | | Amount | Resin | Curing conditions | | | Amount | | Curing conditions | |
| | Core material used | impregnated resin | impregnated (Parts by weight) | impregnating device | Temperature (° C.) | Time (hours) | Surface resin coating | coated (Parts by weight) | Coating device | Temperature (° C.) | Time (hours) |
| --- | --- | --- | --- | --- | --- | --- | --- | --- | --- | --- | --- |
| Example 10 | Ferrite particle obtained in Example 1 | Polyamide-imide resin | 6.5 | Versatile mixer | 180 | 2 | | | None | | |
| Example 11 | | | 6.5 | | 180 | 2 | Polyamide-imide resin | 1 | Fluid bed | 180 | 2 |
| Example 12 | | | | None | | | | 2 | coating device | 180 | 2 |

TABLE 5

| | Physical properties (electric charge amount/electric resistivity) | | | | | | | Magnetic properties at 5 K-1000/4π · A/m (VSM) | | |
| | electric charge amount | Electric resistivity (6.5-mm gap) (Ω) | | | | | Apparent density | Magnetization | Residual magnetization | Coercive force |
| | (μC/g) | 50 V | 100 V | 250 V | 500 V | 1000 V | (g/cm$^3$) | (Am$^2$/kg) | (Am$^2$/kg) | (A/m) |
| --- | --- | --- | --- | --- | --- | --- | --- | --- | --- | --- |
| Example 10 | −46.75 | $1.2 \times 10^{12}$ | $1.4 \times 10^{12}$ | $3.0 \times 10^{11}$ | $2.9 \times 10^{8}$ | — | 1.3 | 66.01 | 3.03 | 24.1 |
| Example 11 | −54.96 | $1.8 \times 10^{12}$ | $2.6 \times 10^{12}$ | $3.0 \times 10^{12}$ | $3.0 \times 10^{12}$ | $2.2 \times 10^{7}$ | 1.34 | 64.67 | 2.78 | 25.7 |
| Example 12 | −20.65 | $1.4 \times 10^{10}$ | $9.8 \times 10^{8}$ | $4.9 \times 10^{6}$ | — | — | 1.27 | 71.61 | 3.08 | 32.1 |

As is apparent in the results shown in Table 5, the ferrite carriers in Examples 10 to 12 have excellent charging properties and electric resistivity under environments.

INDUSTRIAL APPLICABILITY

As the ferrite particles according to the present invention has a low apparent density due to an outer shell structure provided, a specified volume can be filled with a small weight and various properties are maintained in a controllable state. As a result, if the ferrite particles are used as a ferrite carrier core material and impregnated and/or coated with a resin, the electrophotographic developer composed of the ferrite carrier and a toner hardly causes the spent due to reduced agitation stress to the toner, and is excellent in charging stability in the long-time use.

The ferrite particles according to the present invention are used as a ferrite carrier core material. The ferrite carrier and a toner should be widely used as an electrophotographic developer applicable to a full-color machine demanding high definition image quality and a high-speed machine that requires reliability and durability in image quality.

The invention claimed is:

1. A ferrite particle comprising a porous core and an outer shell, the porous core comprising calcined ferrite and the outer shell comprising a Ti oxide, the ferrite particle comprising:
   a) 0.5 wt % to 4 wt % Mg,
   b) 3 wt % to 20 wt % Mn,
   c) 47 wt % to 70 wt % Fe, and
   d) 0.5 wt % to 4.5 wt % Ti;
   wherein the porous core is coated with particles of a Ti oxide to obtain a Ti oxide-coated porous core and Ti oxide-coated porous core is then fired to obtain the ferrite particle comprising the porous core and the outer shell,
   wherein a) through d) are determined with an inductively-coupled plasma emission spectrometer from an aqueous solution of 0.2 g of the particles completely dissolved in 60 mL of pure water, 20 mL of 1 N hydrochloric acid, and 20 mL of 1 N nitric acid.

2. The ferrite particle according to claim 1, wherein thickness of the outer shell is 0.5 to 10 μm.

3. The ferrite particle according to claim 1, wherein the density of the porous core is lower than the density of the outer shell.

4. A plurality of the ferrite particles according to claim 1, wherein the plurality of ferrite particles have a volume average particle diameter from 10 to 100 μm, the volume average particle diameter determined from a cumulative 50% particle diameter under a sieve after measuring the plurality of ferrite particles dispersed in water in laser diffraction/scattering apparatus set to volume distribution mode under a refractive index of 2.42, 25° C., and a relative humidity of 55%.

5. A ferrite carrier comprising the ferrite particle comprising the porous core and the outer shell according to claim 1 and a resin, the resin contacting the particle the contacting being:
   impregnating the ferrite particle,
   coating the ferrite particle, or
   coating and impregnating the ferrite particle.

6. A ferrite carrier comprising a resin and the ferrite particle comprising the porous core and the outer shell according to claim 1, wherein the resin impregnates the ferrite particle.

7. An electrophotographic developer comprising the ferrite carrier of claim 6 and a toner.

8. A method of preparing a refill developer comprising admixing the ferrite carrier of claim 6 and a toner.

9. A ferrite carrier according to claim 6, wherein the resin impregnates at least the porous core of the ferrite particle.

10. A resin coated ferrite carrier comprising a resin and the ferrite particle comprising the porous core and the outer shell according to claim 1, wherein the resin coats the ferrite particle.

11. A ferrite carrier comprising a resin and the ferrite particle comprising the porous core and the outer shell according to claim 1, wherein the resin impregnates and coats the ferrite particle.

12. A ferrite carrier according to claim 11, wherein the resin impregnates at least the porous core of the ferrite particle.

* * * * *